United States Patent
Chang et al.

(10) Patent No.: US 8,431,857 B2
(45) Date of Patent: *Apr. 30, 2013

(54) PROCESS FOR JOINING BRASS PART AND SILICONE CARBIDE CERAMICS PART AND COMPOSITE ARTICLES MADE BY SAME

(75) Inventors: Hsin-Pei Chang, New Taipei (TW); Wen-Rong Chen, New Taipei (TW); Huann-Wu Chiang, New Taipei (TW); Cheng-Shi Chen, New Taipei (TW); Wen-Feng Hu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/166,333

(22) Filed: Jun. 22, 2011

(65) Prior Publication Data
US 2012/0141823 A1 Jun. 7, 2012

(30) Foreign Application Priority Data
Dec. 2, 2010 (CN) .......................... 2010 1 0570278

(51) Int. Cl.
*B23K 11/00* (2006.01)

(52) U.S. Cl.
USPC ................... 219/78.02; 219/78.01; 219/76.13; 219/76.16; 228/122.1; 428/621

(58) Field of Classification Search ............... 219/78.01, 219/78.02, 76.13, 76.16, 121.46; 228/121.1, 228/194, 246; 428/212, 213, 215, 216, 220, 428/332, 335, 336, 446, 450, 610, 632, 633, 428/660, 663, 664, 674, 676, 677, 678, 679, 428/680, 681, 682, 683, 684, 685
See application file for complete search history.

(56) References Cited

U.S. PATENT DOCUMENTS

| | | | | | |
|---|---|---|---|---|---|
| 2,954,803 | A | * | 10/1960 | Barnes et al. | 138/143 |
| 4,601,286 | A | * | 7/1986 | Kaufman | 128/894 |
| 4,961,529 | A | * | 10/1990 | Gottselig et al. | 228/124.1 |
| 5,161,728 | A | * | 11/1992 | Li | 228/124.1 |
| 5,161,908 | A | * | 11/1992 | Yoshida et al. | 403/29 |
| 5,251,803 | A | * | 10/1993 | Kashiba et al. | 228/124.5 |
| 5,607,779 | A | * | 3/1997 | Naoi | 428/634 |
| 6,280,584 | B1 | * | 8/2001 | Kumar et al. | 204/298.15 |
| 2002/0011468 | A1 | * | 1/2002 | Miyasaka et al. | 219/78.02 |
| 2003/0150557 | A1 | * | 8/2003 | Sezi et al. | 156/330.9 |
| 2004/0149813 | A1 | * | 8/2004 | Weihs et al. | 228/246 |
| 2008/0255674 | A1 | * | 10/2008 | Rahaman et al. | 623/23.11 |
| 2009/0072700 | A1 | * | 3/2009 | Kameshima et al. | 313/483 |

FOREIGN PATENT DOCUMENTS
JP          3005637 B2 *  1/2000

* cited by examiner

*Primary Examiner* — Henry Yuen
*Assistant Examiner* — Thien S Tran
(74) *Attorney, Agent, or Firm* — Altis Law Group, Inc.

(57) ABSTRACT

A process for joining a brass part and a silicone carbide ceramics part, comprising steps of: providing a metal part made of brass, a ceramic part made of silicone carbide ceramics, a titanium foil and a nickel foil; bring the metal part, ceramic part, titanium foil and nickel foil into contact, with the titanium and nickel foil inserted between the metal part and ceramic part; applying a pressure of about 20 MPa~60 MPa to the parts to be joined; and simultaneously applying a pulse electric current to the parts while the pressure is applied for heating up the parts to a temperature of about 950° C. to about 1150° C. at a rate of about 50° C./min~300° C./min, maintaining the temperature for about 20 minutes~40 minutes.

7 Claims, 3 Drawing Sheets

PROCESS FOR JOINING BRASS PART AND SILICONE CARBIDE CERAMICS PART AND COMPOSITE ARTICLES MADE BY SAME

CROSS-REFERENCE TO RELATED APPLICATIONS

The present application is related to co-pending U.S. patent application Ser. No. 13/166,344, Pending), entitled "PROCESS FOR JOINING BRASS PART AND SILICONE CARBIDE CERAMICS AND COMPOSITE ARTICLES MADE BY SAME", by Zhang et al. This application has the same assignee as the present application and has been concurrently filed herewith. The above-identified application is incorporated herein by reference.

BACKGROUND

1. Technical Field

The exemplary disclosure generally relates to a process for joining a metal part and a ceramic part, especially to a process for joining a brass part and an silicone carbide ceramics part, and an article made by the process.

2. Description of Related Art

It is desirable to join brass parts and silicone carbide ceramics parts. However, due to the two material having very different values for distinct physical and chemical properties, such as thermal expansion, it can be difficult to join brass and silicone carbide ceramics using traditional bonding methods such as braze welding, fusion welding, and solid diffusion bonding.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the exemplary process for joining brass part and silicone carbide ceramics part, and composite article made by the process. Moreover, in the drawings like reference numerals designate corresponding parts throughout the several views. Wherever possible, the same reference numbers are used throughout the drawings to refer to the same or like elements of an embodiment.

DETAILED DESCRIPTION

Figure 1:
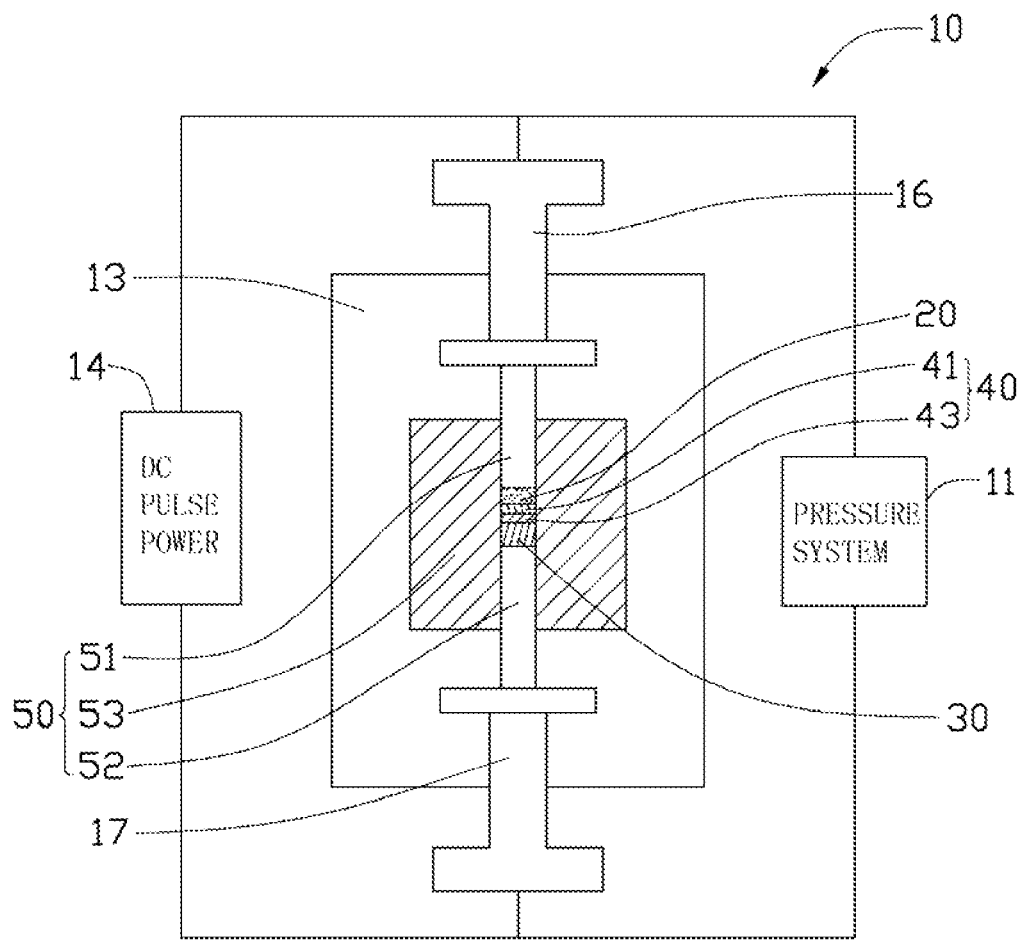
FIG. 1 is a schematic cross-sectional view of an example of a spark plasma sintering device for implementing the present process.

The process according to the present disclosure is generally implemented by a spark plasma sintering (SPS) device as illustrated in FIG. 1.

Figure 2:
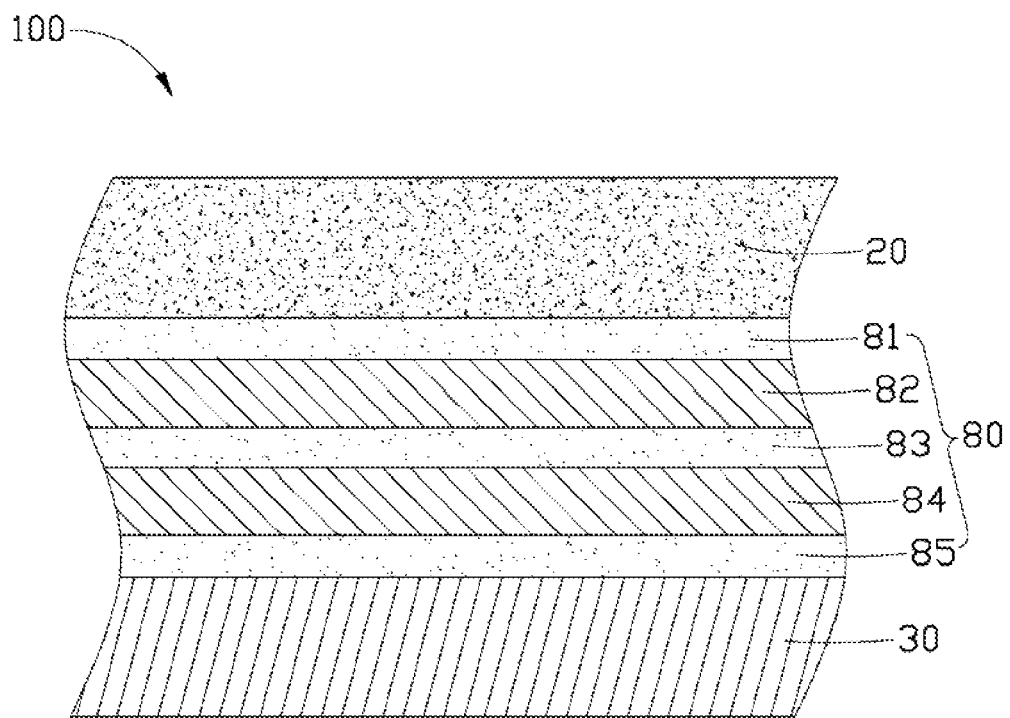
FIG. 2 is a cross-sectional view of an exemplary embodiment of the present article made by the present process.
Figure 3:
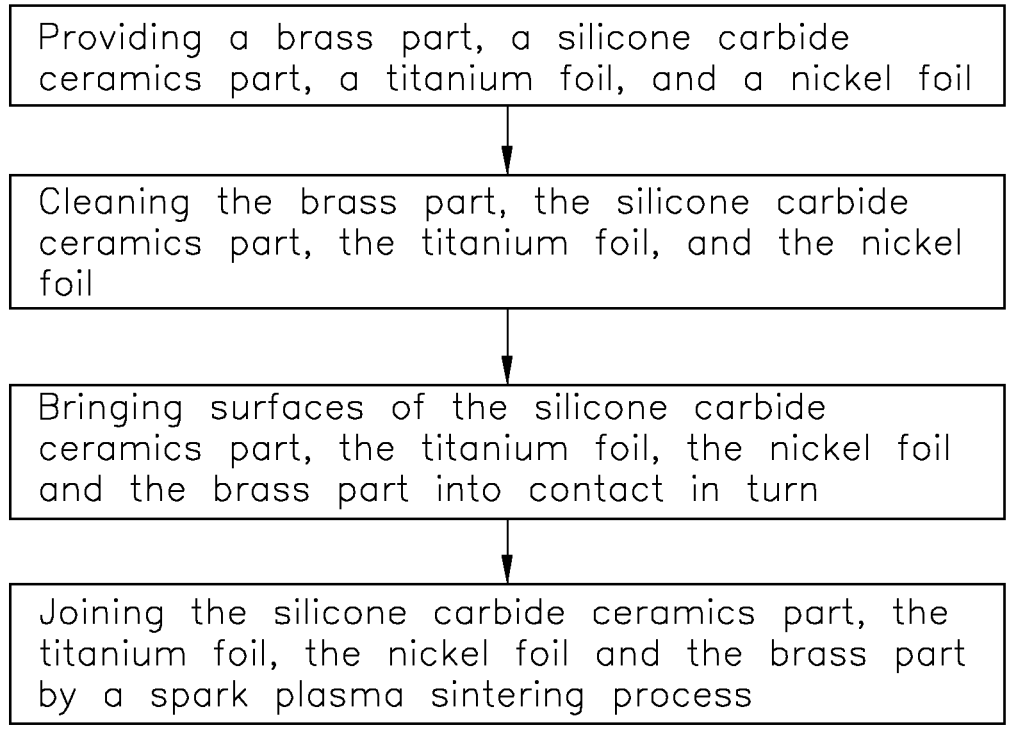
FIG. 3 is a block diagram of a process for joining a brass art and a silicone carbide ceramics part a according to an exemplary embodiment.

Referring to FIGS. 1, 2 and 3, an exemplary process for joining a brass part and an silicone carbide ceramics part may include the least the following steps.

A ceramic part 20 made of silicone carbide ceramics, a metal part 30 made of brass, and an intermediate layer 40 are provided. In this exemplary embodiment, types of the brass may comprise alpha brass, alpha-beta brass, beta brass, lead brass containing 1 wt %~6 wt % lead, tin brass containing 1 wt %~6 wt % tin, aluminum brass containing 1 wt %~6 wt % aluminum, manganese brass containing 1 wt %~6 wt % manganese, iron brass containing 1 wt %~6 wt % iron, silicone brass containing 1 wt %~6 wt % silicone, or nickel brass containing 1 wt %~6 wt % nickel. The intermediate layer 40 connects together the surfaces of the metal part 30 and the ceramic part 20. The intermediate layer 40 may include a titanium foil 41 and a nickel foil 43 stacked on the titanium foil 41. The titanium foil 41 is adjacent to the ceramic part 20 and the nickel foil 43 is adjacent the metal part 30. Each of the titanium foil 41 and the nickel foil 43 has a thickness of about 0.1 mm~0.5 mm. In this exemplary embodiment, the thickness of the titanium foil 41 and the nickel foil 43 each may be about 0.1 mm, 0.15 mm, 0.25 mm, 0.35 mm, 0.4 mm, or 0.5 mm.

The metal part 30, ceramic part 20, and intermediate layer 40 are pretreated. The pretreatment may include polishing the surfaces of the metal part 30, ceramic part 20, and intermediate layer 40, by a 600 grit~1000 grit abrasive paper. Then, the metal part 30, ceramic part 20, and intermediate layer 40 may be activated through cleaning with a solution containing hydrochloric acid or sulphuric acid. Then, the metal part 30, ceramic part 20, and intermediate layer 40 are rinsed with water and dried.

A mold 50 made of electroconductive material, such as graphite, is provided as shown in FIG. 1. The mold 50 includes an upper pressing head 51, a lower pressing head 52, and a middle part 53. The middle part 53 defines a cavity (no shown) for accommodating the parts to be joined.

Subsequently, the metal part 30, ceramic part 20, and intermediate layer 40 are placed into the mold 50 with the intermediate layer 40 inserted between the metal part 30 and the ceramic part 20, the titanium foil 41 contacts the ceramic part 20 and the nickel layer 43, and the nickel foil 43 contacts the titanium foil 41 and the metal part 30. The upper pressing head 51 and the lower pressing head 52 from two opposite sides, compress the metal part 30, ceramic part 20, and intermediate layer 40 together.

A SPS device 10 is provided. The SPS device 10 includes a pressure system 11 for providing pressure to the parts to be joined, a sintering chamber 13, and a DC pulse power 14 for providing pulse current to the parts and heating up the parts. The DC pulse power 14 includes a positive electrode 16 and a negative electrode 17. The pulse-width ratio of the DC pulse power 14 is 6:1, and the maximum amps of the DC pulse power 14 is 8000 A.

The mold 50 is placed in the sintering chamber 13. The upper pressing head 51 and the lower pressing head 52 are electrically connected to the positive electrode 16 and negative electrode 17 of the DC pulse power 14. The sintering chamber 13 is evacuated to a vacuum level between about 6 Pa and about 10 Pa. A pressure between about 20 MPa and 50 MPa is then applied to the parts through the upper pressing head 51 and the lower pressing head 52. While the pressure is applied, a pulse electric current between about 1000 A and 8000 A with a pulse-width ratio of 6:1 is simultaneously applied to the parts, heating the parts at a rate less than 50 degrees Celsius per minute (° C./min) when the temperature of the parts are less than about 300° C., and heating the parts at a rate of about 80° C./min~200° C./min when the temperature of the parts are above about 300° C. The temperature of the parts is maintained at about 750° C.~950° C. for about 10 minute~35 minutes, such as 10 minutes, 20 minutes or 35 minutes. Under the above mentioned conditions, particles of the metal part 30, ceramic part 20, and intermediate layer 40 will react and fuse with each other to form a joining part 80

(shown in FIG. 2) having multiple between the metal part 30 and the ceramic part 20. Thereby, the metal part 30 and the ceramic part 20 are joined via the intermediate layer 40, forming a composite article 100.

Once the composite article 100 is cooled down, the composite article 100 can be removed.

Owing to the present process, a permanent joint of great strength, in this exemplary embodiment, a joining part 80 is obtained. The process requires a short hold time and a low vacuum level of the sintering chamber 13, thus significantly saves time and energy. Additionally, coefficients of thermal expansion of the ceramic part 20, titanium foil 41, nickel foil 43, metal part 30 are gradually increased, i.e., a coefficient of thermal expansion of the intermediate layer 40 is between the coefficient of thermal expansion of the ceramics part 20 and the coefficient of thermal expansion of the metal part 30 and gradually changes from a value close to that of the ceramic part 20 in the area of the bond of the ceramic part 20 and the joint part 80 to a value close to that of the metal part 30 in the area of the bond of the joint part 80 with the metal part 30. Thus, thermal stress between the ceramics part 20 and metal part 30 can be reduced by the intermediate layer 40 thereby improving the binding force between the ceramics part 20 and metal part 30 so the ceramics part 20 can be firmly joined with the metal part 30.

FIG. 2 shows a composite article 100 manufactured by the present process. The composite article 100 includes the metal part 30, the ceramic part 20, and multi-layered joining part 80 joining the metal part 30 and the ceramic part 20. The various layers of the joining layer 80 result from differing interaction between the metal part 30, titanium layer 82, nickel layer 84, and ceramic part 20. In particular, the joining layer 80 includes:

a) a first transition layer 81: The first transition layer 81 is located between the ceramics layer 20 and the titanium layer 82. The first transition layer 81 mainly includes compounds composited aluminum element and carbon element, such as titanium carbide, and compounds composited titanium element and silicone element, such as titanium silicide, etc. This chemical results result from chemical reactions between adjacent portions of the ceramics layer 20 and titanium layer 82;

b) a titanium layer 82: The titanium layer 82 results from portions of the titanium layer 82 that do not react with either the ceramics layer 20 or the nickel layer 84;

c) a second transition layer 83: The second transition layer 83 is located between the nickel layer 84 and the titanium layer 82. The second transition layer 83 mainly includes chemical compounds comprising nickel element and titanium element, and of nickel with titanium solid solutions. The chemical results result from chemical reactions between adjacent portions to the titanium layer 82 and the nickel layer 84;

d) a nickel layer 84: The nickel layer 84 results from portions of the nickel layer 84 that do not react with either the titanium layer 82 or the ceramic part 20;

e) a third transition layer 85: The third transition layer 85 is located between the nickel layer 84 and the metal part 30. The third transition layer 85 mainly includes nickel with copper solid solutions, and chemical compounds comprising nickel element and copper element. The chemical results result from chemical reactions between adjacent portions to the nickel layer 84 and the metal part 30.

The thermal expansion rate of the joining layer 80 gradually changes from a value close to that of the ceramic part 20 (in the area of 81) to a value close to that of the metal part 30 (in the area of 85). This results in a composite article well suited to temperature changes due to the gradual, rather than abrupt, changes in its internal thermal expansion rates.

Furthermore, the joining part 80 of the composite article 100 has no crack or aperture, and has a smooth surface. The metal/ceramic interface of the composite article 100 has a shear strength between about 20 MPa and 40 MPa, and a tensile strength between about 30 MPa and 60 MPa.

It is to be understood, however, that even through numerous characteristics and advantages of the exemplary disclosure have been set forth in the foregoing description, together with details of the system and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A process for joining a brass part and a silicone carbide ceramics part, comprising steps of:
    providing a brass part, a silicone carbide ceramics part, a titanium foil, and a nickel foil;
    bringing surfaces of the silicone carbide ceramics part, the titanium foil, the nickel foil and the brass part into contact in turn;
    applying a joining pressure between about 20 MPa and 50 MPa to the silicone carbide ceramics part, the titanium foil, the nickel foil and the brass part; and
    simultaneously applying a pulse electric current to the silicone carbide ceramics part, the titanium foil, the nickel foil and the brass part while the joining pressure is applied, heating the silicone carbide ceramics part, the titanium foil, the nickel foil and the brass part at a rate below 50° C./min when a temperature of the silicone carbide ceramics part, the titanium foil, the nickel foil and the brass part is below about 300° C.; when the temperature of the silicone carbide ceramics part, the titanium foil, the nickel foil and the brass part is above about 300° C., heating the silicone carbide ceramics part, the titanium foil, the nickel foil and the brass part at a rate of about 80~200° C./min until to a joining temperature of about 750° C. to about 950° C., and maintaining the joining temperature for about 10~35 minutes;
    wherein the brass part comprises one selected from the group consisting of alpha brass, alpha-beta brass, beta brass, lead brass containing 1~6 wt % lead, tin brass containing 1~6 wt % tin, titanium brass containing 1~6 wt % titanium, manganese brass containing 1~6 wt % manganese, iron brass containing 1~6 wt % iron, silicone brass containing 1~6 wt % silicone, and nickel brass containing 1~6 wt % nickel.

2. The process as claimed in 1, wherein the step of applying the joining pressure further comprises placing the silicone carbide ceramics part, the titanium foil, the nickel foil and the brass part in a sintering chamber of a spark plasma sintering device, the joining pressure being applied to the silicone carbide ceramics part, the titanium foil, the nickel foil and the brass part through an upper pressing head and a lower pressing head.

3. The process as claimed in claim 2, wherein the sintering chamber is evacuated to a vacuum level of about 6 Pa to about 10 Pa.

4. The process as claimed in claim 2, wherein the spark plasma sintering device has a DC pulse power, the upper pressing head and the lower pressing head are respectively electrically connected with a positive electrode and a negative electrode of the DC pulse power.

5. The process as claimed in claim 1, wherein the pulse electric current applied to the metal part, ceramic part, and nickel foil is about 1000~8000 A with a pulse-width ratio of 6:1.

6. The process as claimed in claim 1, wherein both the nickel foil and titanium foil have a thickness between about 0.1 mm and 0.5 mm.

7. The process as claimed in claim 1, wherein the process further comprising polishing and activating the silicone carbide ceramics part, the titanium foil, the nickel foil and the brass part by cleaning with solution containing hydrochloric acid or sulphuric acid, before the step of bring into contact.

* * * * *